United States Patent [19]

Lingerfelt

[11] Patent Number: 5,640,836
[45] Date of Patent: Jun. 24, 1997

[54] BLADE ASSEMBLY FOR WEED TRIMMERS

[75] Inventor: Larry G. Lingerfelt, Dahlonega, Ga.

[73] Assignee: Weed Hog Inc., Dahlonega, Ga.

[21] Appl. No.: 543,168

[22] Filed: Oct. 13, 1995

[51] Int. Cl.$^6$ .................................................. A01D 34/73
[52] U.S. Cl. ................. 56/255; 56/12.7; 56/DIG. 20; 30/276
[58] Field of Search ............... 56/255, 295, 17.5, 56/DIG. 17, DIG. 20, 12.1, 12.7; 30/276

[56] References Cited

U.S. PATENT DOCUMENTS

| | | | |
|---|---|---|---|
| D. 299,484 | 1/1989 | Lee | D8/8 |
| 1,868,918 | 7/1932 | Schenk | 56/255 |
| 3,815,234 | 6/1974 | Nelson et al. | 30/347 |
| 4,062,114 | 12/1977 | Luick | 56/12.7 X |
| 4,114,354 | 9/1978 | Morris | 56/295 |
| 4,199,926 | 4/1980 | Petty | 56/295 |
| 4,250,621 | 2/1981 | Houle | 56/295 |
| 4,856,194 | 8/1989 | Lee | 30/276 |
| 4,938,012 | 7/1990 | Klima | 56/295 |
| 4,977,935 | 12/1990 | Davis | 56/295 |
| 5,109,656 | 5/1992 | Zimmer | 56/17.5 |
| 5,284,006 | 2/1994 | Sheldon | 56/295 |

Primary Examiner—Terry Lee Melius
Assistant Examiner—Heather Shackelford
Attorney, Agent, or Firm—Kenneth S. Watkins, Jr.

[57] ABSTRACT

A blade assembly for weed trimmers for cutting heavy weeds, vines and underbrush comprises a seamless, one-piece, disk-shaped hub. Pivot pins attach two or more steel blades to the hub within a circumferential groove. The groove extends from the outside edge of the hub towards the center of the hub. The upper and lower portions of the hub above and below the groove support the blades vertically. The blades are free to pivot in a horizontal plane when they strike an object. The groove depth is at least one half of the blade width to provide vertical support. The blades are at least one half of the hub diameter. The blades are spaced equally around the circumference of the hub.

11 Claims, 2 Drawing Sheets

BLADE ASSEMBLY FOR WEED TRIMMERS

BACKGROUND OF THE INVENTION

The present invention relates to cutting blade assemblies and, more specifically, to cutting blade assemblies for rotary weed trimmers.

Individuals and commercial enterprises have made weed trimmers very popular due to the ease of use, speed and fine trimming capabilities of these devices. Rotary weed trimmers utilizing plastic "string" cutting heads have been especially popular. While the "string" cutters are effective on grass and some weeds, they are not effective for cutting heavy weeds, vines, brush and other heavy undergrowth. The requirement for flexibility significantly limits the durability of the string, requiring frequent replacement. Although cutting heads for "string" cutters utilize reels of string to provide replacement string material, feeding is often cumbersome and imprecise. Cutter heads offering string feed mechanisms are often complicated and resulting seams and mechanisms in the head result in increased opportunity for breakage and entanglement with weeds, vines and foreign materials Trimmer blades with fixed or pivoting blades offer improved performance in cutting heavier vines and undergrowth. However, cutter heads for these blades are often complicated or employ exposed blade pivots resulting in entanglement of the cutter assembly. Blades are often plastic and short in comparison with the diameter of the cutter head. Trimmers employing these type of cutter heads suffer from missed areas when the trimmer blade assembly is moved rapidly. Reliability and durability of the blade assemblies is poor in heavy cutting environments.

SUMMARY OF THE INVENTION

The shortcomings of current designs accent the need for a new blade assembly for weed trimmers which provides improved performance and reliability.

Therefore an object of the present invention is to provide a blade assembly for weed trimmers which is effective in cutting heavy weeds, vines and underbrush.

Another object of the present invention is to provide a blade assembly which is durable and rugged.

Another object of the present invention is to provide a blade assembly which has long blades in relation to the hub diameter to improve cutting area coverage.

Another object of the present invention is to provide a blade assembly whose design reduces entanglement in weeds, vines and foreign material.

The blade assembly of the present invention comprises a disk-shaped hub. The hub is a solid, one-piece structure with a ring-shaped groove in the hub edge of the disk. Two sharpened steel blades are retained in the groove of the hub by pivot pins extending vertically through the groove. The pivot pins extend through a blade hole in one end of the blades to allow the blade to pivot in a horizontal plane about the pin. The pin is retained in portions of the hub edge above and below the groove. The portions of the solid hub above and below the groove provide vertical support of the blades and cover the pivot pin. The blades are equally spaced around the circumference of the hub.

In the preferred embodiment of the present invention, the groove is at least as deep as the width of the blades. The support produced by the upper and lower portions of the solid hub allows relatively long blades in relation to the diameter of the hub. The longer blades provide additional cutting length resulting in reduced skipped areas and improved blade life.

Alternative embodiments of the invention employ more than two blades. The blades may be reversible. Alternate methods are used to secure the pivot pins in the hub.

BRIEF DESCRIPTION OF THE DRAWINGS

These and other features, aspects and advantages of the present invention will become better understood with regard to the following description, appended claims and accompanying drawings where:

DESCRIPTION OF THE PREFERRED EMBODIMENTS

Figure 1:
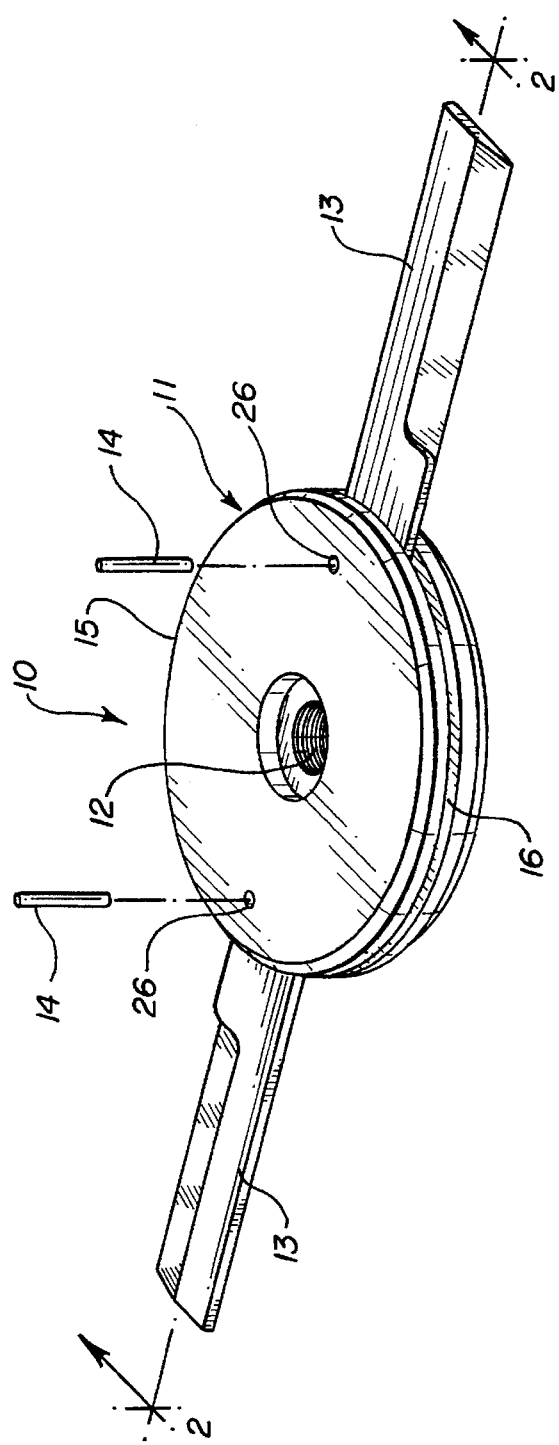
FIG. 1 is a perspective drawing of the preferred embodiment of the blade assembly.

FIG. 1 is a perspective drawing of the preferred embodiment of blade assembly 10. Hub 11 is attached to the rotating shaft of a weed trimmer (not shown) by threaded connector 12. Two blades 13 are pivotally attached to hub 11 by pivot pins 14. Blades 13 and pivot pins 14 are equally spaced around the circumference 15 of hub 11 to maintain balance of the assembly during rotation. Blades 13 pivot within circumferential groove 16.

Figure 2:
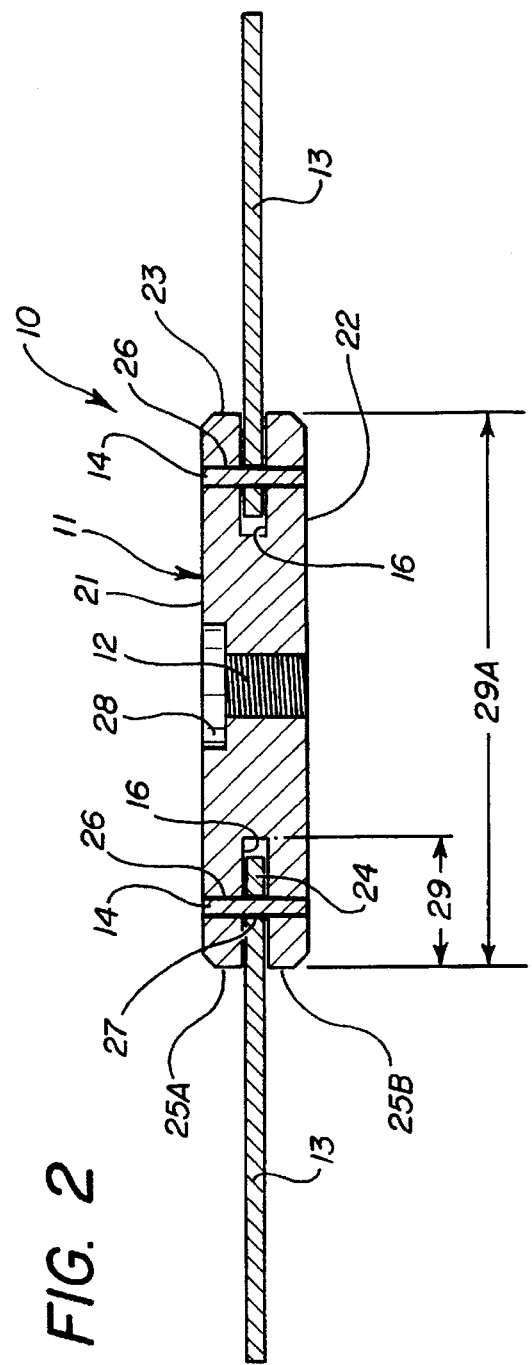
FIG. 2 is a cross sectional view of the blade assembly taken along line 2—2 of FIG. 1.

FIG. 2 is a cross sectional view taken along line 2—2 of FIG. 1. Hub 11 is generally disk-shaped comprising top surface 21, bottom surface 22 and hub edge 23. In the preferred embodiment, top surface 21 and bottom surface 22 are flat surfaces. Hub edge 23 comprises upper edge portion 25A and lower edge portion 25B. Groove 16 is a ring-shaped circumferential groove having a U-shaped cross section, opening at the outer surface of hub edge 23 and extending inward towards the center of hub 11. Groove 16 separates upper edge portion 25A from lower edge portion 25B. Blade 13 is pivotally attached to hub 11 within groove 16 by pivot pin 14. Pivot pin 14 is inserted into hub hole 26 and blade hole 27 of blade end 24 (see FIG. 3). Hub hole 26 extends vertically through upper edge portion 25A and lower edge portion 25B. Pivot pin 14 passes vertically through groove 16.

Pivot pin 14 forms an interference fit in hub hole 26 to retain the pin securely in upper edge portion 25A and lower edge portion 25B of hub 11. Blade hole 27 forms a loose fit with pivot pin 14 to allow horizontal pivoting of blade 13 in groove 16. Upper edge portion 25A and lower edge portion 25B of one-piece hub 11 provide vertical support to blade 13. The fit of blade 13 in groove 16 is made tight enough to provide vertical support without excessive deflection of blade 13 and loose enough to allow pivoting of blade 13 in the groove.

Counterbored portion 28 is machined in hub 11 at threaded connector 12. The counterbored portion allows a close fit between hub 11 and a trimmer guard (not shown) when the trimmer shaft comprises a machined shoulder (not shown). The close fit between top surface 21 and the trimmer guard reduces chances of weeds, vines or foreign material becoming entangled between the hub and guard.

Hub 11 is made of metal, high strength plastic or composite material. In the preferred embodiment, hub 11 is made from machined aluminum. This one-piece construction results in a structure with no seams, increasing the strength of the hub and reducing entanglement of weeds, vines or foreign material which might otherwise catch in a seam.

In alternative embodiments, pivot pin 14 may be replaced by other pivot connectors such as a threaded fastener. The use of a pivot pin such as a dowel pin allows the pin to fit flush and smooth with top surface 21 and bottom surface 22 of hub 11, further reducing possibility of entanglement. Pivot pin 14 is made from steel or other high strength material.

Figure 3:
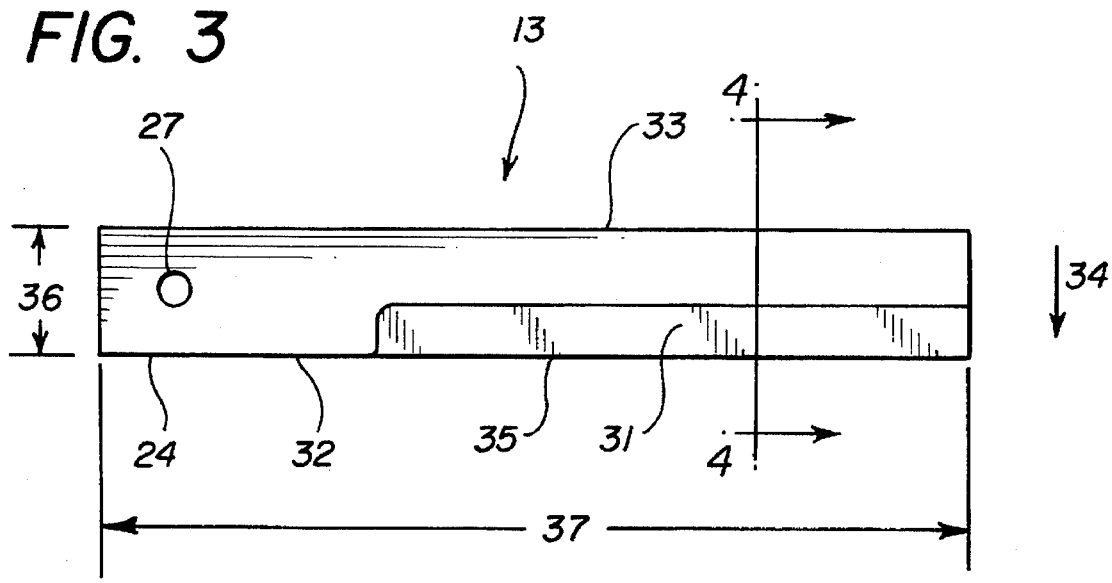
FIG. 3 is a detail plan view of one of the blades of FIG. 1.

FIG. 3 is a plan view of blade 13 with blade hole 27 in blade end 24. In the preferred embodiment, blade 13 is generally rectangular as viewed from the top with leading edge 32 and trailing edge 33. Cutting surface 31 is ground in edge 32 of blade 13 resulting in cutting edge 35 to provide a cutting action in the direction of blade travel 34. A second cutting surface (not shown) may be ground in edge 33 to allow blade 13 to be reversed when cutting edge 35 becomes dull.

Figure 4:
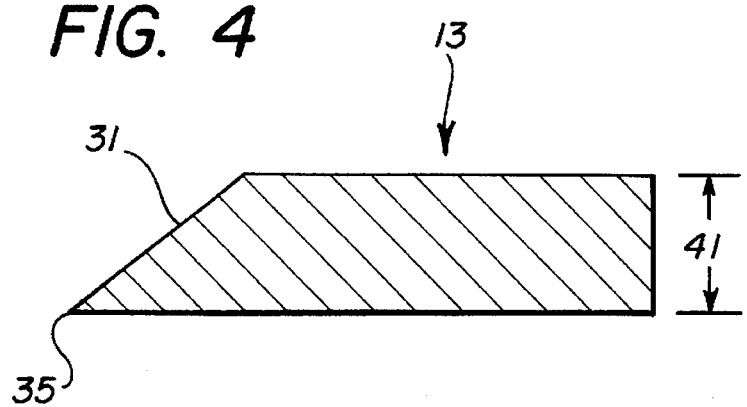
FIG. 4 is a cross sectional view taken along line 4—4 of FIG. 3.

FIG. 4 is a cross sectional view taken along line 4—4 of FIG. 3 showing cutting surface 31 and cutting edge 35. Blade thickness 41 is at least 0.100 inch to provide desired ruggedness necessary for thick weeds and underbrush. In the preferred embodiment, blade thickness 41 is 0.1875 inch and the material is cold-rolled steel. Vertical blade support is enhanced by a sufficiently deep groove (16 of FIG. 2). Groove depth (29 of FIG. 2) should be at least equal to one half of blade width (36 of FIG. 3) to provide adequate vertical support to blade 13. In the preferred embodiment, groove depth is equal to or greater than blade width.

The use of a solid, one-piece seamless hub and sufficient groove depth allows long blades relative to hub diameter. Blade length (37 of FIG. 3) in the present invention is typically greater than ½ hub diameter (29A of FIG. 2). In the preferred embodiment, blade length is greater than the hub diameter.

During operation, the shaft of the trimmer rotates hub 11. Centrifugal force extends blades 13 radially from the center of the hub. Blades 13 may pivot in a horizontal plane about pivot pins 14 when the blades strike a solid object. Pivot pins 14, upper edge portion 25A and lower edge portion 25B support blades 13 vertically.

Accordingly the reader will see the Blade Assembly for Weed Trimmers provides a high performance, long life cutting device. The device comprises the following additional advantages:

the lack of seams and exposed pivot joints reduces entanglement with weeds, vines and foreign material;

the structural design results in a blade assembly with a long blade length in relation to hub diameter, increasing cutting ability and ruggedness, and reducing "missed spots" compared to previous designs;

it is simple and can be manufactured at low cost.

Although the description above contains many specifications, these should not be construed as limiting the scope of the invention but as merely providing illustrations of some of the presently preferred embodiments of this invention. For example, the top, bottom and edge surfaces may be curved, the hub edge may be angled and additional blades added, etc.

Thus the scope of the invention should be determined by the appended claims and their legal equivalents, rather than by the examples given.

I claim:

1. A blade assembly for a weed trimmer, the assembly comprising:

(a) a one-piece seamless metal hub, the hub being disk-shaped comprising a top surface, a bottom surface, and a hub edge, the hub edge comprising an upper edge portion, a lower edge portion, and a ring-shaped groove, the groove separating the upper edge portion from the lower edge portion, the groove having a U-shaped cross section and extending from an outer surface of the hub edge inward towards a center of the hub;

(b) at least two blades, the blades equally spaced around a circumference of the hub, the blades made of steel, each of said at least two blades comprising a sharpened edge, and a blade hole at a first end of the blade, said each of said at least two blades secured pivotally in the groove of the hub by a pivot pin, the pivot pin passing through the groove and the blade hole, and secured in the upper edge portion and the lower edge portion of the hub; and (c) a threaded connector for attaching the hub to a weed trimmer.

2. The blade assembly of claim 1 wherein said each of said at least two blades has a predetermined blade width and the groove has a predetermined groove depth and wherein the groove depth is greater than one half the blade width.

3. The blade assembly of claim 1 wherein the hub has a predetermined hub diameter and said each of said at least two blades has a predetermined blade length such that the blade length is greater than one half of the hub diameter.

4. The blade assembly of claim 1 wherein said each of said at least two steel blades has a uniform thickness, the thickness being at least 0.100 inches.

5. The blade assembly of claim 1 wherein the threaded connector is disposed in the hub and comprises a counter-bored portion.

6. The blade assembly of claim 1, wherein the pivot pin forms an interference fit with the hub hole.

7. The blade assembly of claim 1 wherein the hub is made of metal.

8. The blade assembly of claim 1 wherein the hub is made of aluminum.

9. A blade assembly for a weed trimmer, the assembly comprising:

(a) a one-piece seamless hub, the hub being disk-shaped comprising a top surface, a bottom surface and a hub edge, the hub edge comprising an upper edge portion, a lower edge portion, and a ring-shaped groove of U-shaped cross section, the groove separating the upper edge portion from the lower edge portion and having a predetermined groove depth extending from an outside surface of the hub edge inward towards a center of the hub, the hub made of aluminum and having a predetermined hub diameter;

(b) at least two steel blades of predetermined blade length and predetermined blade width, the blades made of steel and having a uniform thickness, the thickness being at least 0.100 inches, each of said at least two steel blades comprising a sharpened edge and a blade hole at a first end of the blade and secured pivotally in the groove of the hub by a pivot pin, the pivot pin having an interference fit in a hub hole, the hub hole extending vertically from the upper edge portion to the lower edge portion so that the pivot pin passes through the groove;

(c) a threaded connector in the hub for attaching the hub to a weed trimmer; and wherein the blade length is greater than one half of the hub diameter and the groove depth is greater than one half of the blade width.

10. A blade assembly for a weed trimmer, the assembly comprising:

(a) a one-piece seamless hub, the hub being disk-shaped comprising a top surface, a bottom surface, and a hub edge, the hub edge comprising an upper edge portion, a lower edge portion, and a ring-shaped groove, the groove separating the upper edge portion from the lower edge portion, the groove having a U-shaped cross section and extending from an outer surface of the hub edge inward towards a center of the hub;

(b) at least two blades, the blades equally spaced around a circumference of the hub, the blades made of steel, each of said at least two blades comprising a sharpened edge, and a blade hole at a first end of the blade, said each of said at least two blades secured pivotally in the groove of the hub by a pivot pin, the pivot pin passing through the groove and the blade hole, and secured in the upper edge portion and the lower edge portion of the hub; and (c) threads integral to the hub for attaching the hub to the weed trimmer.

11. The blade assembly of claim 10 wherein the hub has a predetermined hub diameter and said each of said at least two blades has a predetermined blade length such that the blade length is greater than the hub diameter.

* * * * *